United States Patent
Miranda

(10) Patent No.: US 10,079,936 B2
(45) Date of Patent: *Sep. 18, 2018

(54) METHODS, SYSTEMS AND APPLICATIONS FOR PORTING TELEPHONE NUMBERS ON WIRELESS DEVICES

(71) Applicant: TracFone Wireless, Inc., Miami, FL (US)

(72) Inventor: Nestor Miranda, Miami, FL (US)

(73) Assignee: TracFone Wireless, Inc., Miami, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/783,338

(22) Filed: Oct. 13, 2017

(65) Prior Publication Data

US 2018/0054516 A1  Feb. 22, 2018

Related U.S. Application Data

(63) Continuation of application No. 14/989,260, filed on Jan. 6, 2016, now Pat. No. 9,794,401.

(60) Provisional application No. 62/100,305, filed on Jan. 6, 2015.

(51) Int. Cl.
| | | |
|---|---|---|
| *H04W 8/28* | (2009.01) | |
| *H04W 4/50* | (2018.01) | |
| *H04W 4/00* | (2018.01) | |
| *H04M 3/42* | (2006.01) | |
| *H04M 1/725* | (2006.01) | |

(52) U.S. Cl.
CPC ... *H04M 3/42153* (2013.01); *H04M 1/72522* (2013.01); *H04M 3/42289* (2013.01); *H04M 3/42297* (2013.01); *H04W 4/001* (2013.01); *H04W 4/50* (2018.02); *H04W 8/28* (2013.01)

(58) Field of Classification Search
CPC combination set(s) only.
See application file for complete search history.

(56) References Cited

U.S. PATENT DOCUMENTS

| | | | |
|---|---|---|---|
| 6,097,801 | A | 8/2000 | Williams et al. |
| 6,240,293 | B1 | 5/2001 | Koster |
| 7,606,351 | B2 | 10/2009 | Niwa |
| 8,107,953 | B2 | 1/2012 | Zimmerman et al. |
| 8,422,651 | B2 | 4/2013 | Krishnamoorthy et al. |
| 8,620,265 | B1 | 12/2013 | Gailloux et al. |
| 9,019,208 | B2 | 4/2015 | Asakura |
| 9,794,401 | B2* | 10/2017 | Miranda ............ H04M 1/72522 |
| 2002/0107011 | A1 | 8/2002 | Mazzarella et al. |
| 2003/0027521 | A1 | 2/2003 | Yip et al. |
| 2005/0224809 | A1 | 4/2005 | Clayton |
| 2011/0111756 | A1 | 5/2011 | Imbimbo et al. |
| 2013/0260748 | A1 | 10/2013 | Li et al. |
| 2014/0051417 | A1 | 2/2014 | Wuerch et al. |
| 2014/0106728 | A1 | 4/2014 | Aboulhosn et al. |

(Continued)

*Primary Examiner* — Steven Kelley
(74) *Attorney, Agent, or Firm* — Baker & Hostetler LLP

(57) ABSTRACT

The application is directed to a method and system for improving user experience with porting a telephone number to an electronic device. The method includes the steps of displaying a user interface on a display of the electronic device for initiating porting of a telephone number. Upon receiving user information via the user interface associated with the telephone number, it is determined whether the telephone number is portable. If the telephone number is portable, it is transmitted to the electronic device.

20 Claims, 5 Drawing Sheets

(56) References Cited

U.S. PATENT DOCUMENTS

2014/0248852 A1   9/2014  Raleigh et al.
2014/0273965 A1   9/2014  Raleigh et al.

\* cited by examiner

METHODS, SYSTEMS AND APPLICATIONS FOR PORTING TELEPHONE NUMBERS ON WIRELESS DEVICES

CROSS-REFERENCE TO RELATED APPLICATIONS

This application is a continuation of the U.S. patent application Ser. No. 14/989,260, filed Jan. 6, 2016, now U.S. Pat. No. 9,794,401 issued Oct. 17, 2017, which is incorporated herein by reference in its entirety. This application also claims the benefit from U.S. Provisional Application No. 62/100,305 filed on Jan. 6, 2015, which is hereby incorporated by reference in its entirety for all purposes as if fully set forth herein.

BACKGROUND OF THE DISCLOSURE

1. Field of the Disclosure

The invention generally relates to methods, systems, and software applications for porting telephone numbers on wireless devices. More particularly, the invention relates to relates to methods, systems, and software applications for porting telephone numbers independent of, during, or after activation of a wireless device.

2. Related Art

Many telephone customers are generally hesitant to switch telephone service providers due to the inconveniences, which may stem therefrom. One such inconvenience may include porting a telephone number from one service provider to another service provider. Telephone service providers may include, for example, wireless service providers, landline service providers, voice over Internet protocol (VoIP) providers and the like.

Porting is governed by the Federal Communications Commission's Local Number Portability (LNP) rules. Specifically, the rules generally require that customers can switch their telephone number to a new service provider as long as the customer remains in the same geographic area. A geographic area can include a general metropolitan area such as, for example, New York City. That is, customers remaining in the same geographic area can maintain their telephone number from a landline, wireless, or VoIP provider.

The porting process may take anywhere from a couple hours to a couple days. The duration of time for porting depends upon a couple factors including, but not limited to, the time for a customer to initiate the request, the complexity of the request (plurality of numbers to port), the process time of the new service provider, and the backlog of the old service provider. Moreover, the porting process usually requires completing authorization forms, which need to be faxed to the current service provider. Alternatively, the authorization requires access to the Internet to submit a request to the current service provider. While some service providers have customer service representatives which may assist with the porting request, the time spent may be deducted from available minutes and/or require considerable time waiting for a representative.

A need exists in the art for innovative methods, systems, and software applications on electronic devices to help improve user experience with porting telephone numbers from/to a landline, wireless, and/or VoIP provider.

Another need exists in the art for methods, systems, and software applications to reduce the time required to complete porting from an old service provider to a new service provider.

Yet another need exists in the art for methods, systems, and software applications on electronic devices, which inform the customer of the progress of the porting process.

SUMMARY OF THE INVENTION

The foregoing needs are met, to a great extent, by the invention, with a process, system, and application for porting telephone numbers through an electronic device.

One aspect of the invention is directed to a method for improving user experience with porting a telephone number received from a wireless, landline, or VoIP telephone service provider. For brevity, the invention will be described with respect to a wireless service provider but is not limited thereto and is equally applicable to a landline or VoIP service provider. In addition, the invention will be described with respect to a wireless device but is not limited thereto and is equally applicable to all electronic devices being wired or wireless. The method includes a step of displaying a user interface on a display of the electronic device for initiating porting of a telephone number. User information associated with the telephone number is received via the user interface. Next, it is determined whether the telephone number is portable. Further, the telephone number is transmitted to the electronic device.

Another aspect of the invention is directed to a system for improving user experience with porting a telephone number to an electronic device. The electronic device includes a non-transitory memory having instructions stored thereon for porting the telephone number to the electronic device. The system also includes a display for displaying a user interface having a prompt to input the telephone number. The system further includes a processor that is operatively coupled to the memory and the display. The processor is configured to perform the instructions including, for example, receiving the user information via the user interface, and determining whether the received telephone number is portable.

Yet another aspect of the invention is directed to a non-transitory computer readable storage medium storing computer-readable instructions for a software application for a software application for improving user experience with porting a telephone number to an wireless phone, which when executed, causes the wireless phone to perform the following steps: display a user interface on a display of the wireless phone for initiating porting of a telephone number; determine whether the telephone number is portable upon receiving user information via the user interface; and transmit the telephone number to the wireless phone.

There has thus been outlined, rather broadly, certain aspects of the invention in order that the detailed description thereof herein may be better understood, and in order that the present contribution to the art may be better appreciated. There are, of course, additional aspects of the invention that will be described below and which will form the subject matter of the claims appended hereto.

In this respect, before explaining at least one aspect of the invention in detail, it is to be understood that the invention is not limited in its application to the details of construction and to the arrangements of the components set forth in the following description or illustrated in the drawings. The invention is capable of aspects or aspects in addition to those described and of being practiced and carried out in various ways. Also, it is to be understood that the phraseology and terminology employed herein, as well as the abstract, are for the purpose of description and should not be regarded as limiting.

Reference in this application to "one aspect," "an aspect," "one or more aspects," "an aspect" or the like means that a particular feature, structure, or characteristic described in connection with the aspect is included in at least one aspect of the disclosure. The appearances of, for example, the phrases "an aspect" in various places in the specification are not necessarily all referring to the same aspect, nor are separate or alternative aspects mutually exclusive of other aspects. Moreover, various features are described which may be exhibited by some aspects and not by the other. Similarly, various requirements are described, which may be requirements for some aspects but not by other aspects.

As such, those skilled in the art will appreciate that the conception upon which this disclosure is based may readily be utilized as a basis for the designing of other structures, methods, and systems for carrying out the several purposes of the invention. It is important, therefore, that the claims be regarded as including such equivalent constructions insofar as they do not depart from the spirit and scope of the invention.

BRIEF DESCRIPTION OF THE DRAWINGS

In order to facilitate a fuller understanding of the invention, reference is now made to the accompanying drawings, in which like elements are referenced with like numerals. These drawings should not be construed as limiting the invention and intended only to be illustrative.

DETAILED DESCRIPTION

Figure 1:
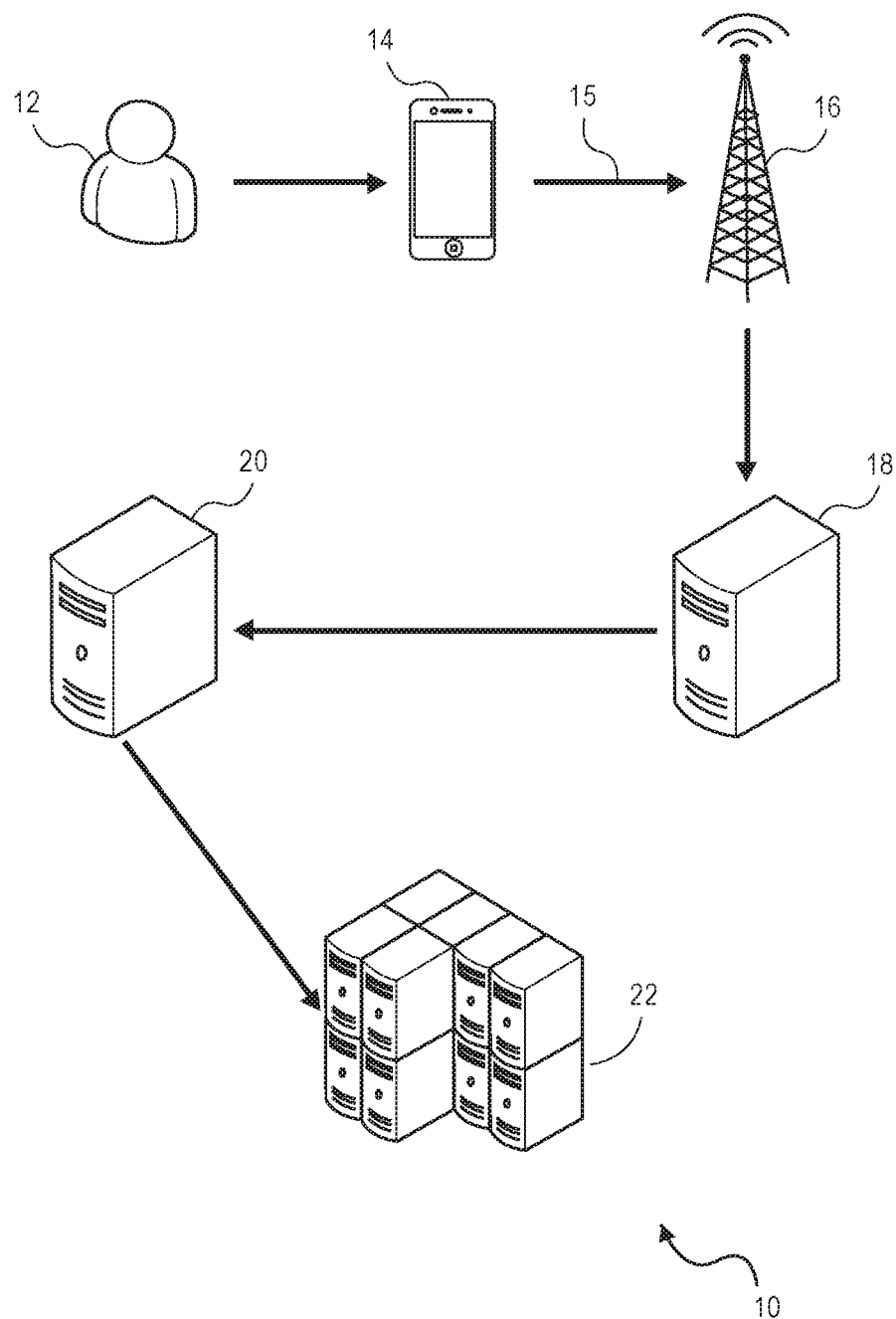
FIG. 1 illustrates a wireless device system in accordance with an aspect of the invention.

In today's marketplace, it would be beneficial to equip an electronic device, such as a wireless phone, with the tools necessary to efficiently port a telephone number. Preferably, the porting may be accomplished on the electronic device without requiring live customer service agents or authorization forms requiring transmittal via facsimile or the Internet. In some instances, it would be beneficial to make porting relatively simple. This may be attributed to the original and new service providers being one and the same. In other instances, the porting process requires more effort since the original service provider is different from the new service provider. As such, an additional, external communication step may be required to authorize the telephone number switch from the original service provider to the new service provider.

Generally, porting should be accomplished while the service for the telephone number on the original service provider is still active. In other words, the porting process cannot be completed if the original service is terminated. Otherwise, it is conceivable for the telephone number to be reassigned to another subscriber. Therefore, to ensure the porting process can port the telephone number from the original service provider, the subscriber should maintain service with both the original and new service providers. After the telephone number has been ported over to the electronic device configured with the new service provider, service with the old service provider may be cancelled.

One aspect of the invention is directed to a method, system, and application for improving user experience on an electronic device for porting telephone numbers.

Another aspect of the invention is directed to a system, method, and application for accelerating the process for porting caused by downtime during transmittal of authorization forms via facsimile and the Internet, or communications with live customer service representatives.

Yet another aspect of the invention is directed to a system, method, and application for providing a user with a tracking system offering real-time progress of the porting process.

It is to be understood that the system modules and method steps described in this application may be employed in various forms of hardware, software, firmware, special purpose processors, or a combination thereof. The application preferably is directed to a process and system utilizing a software application comprising executable code that is operably stored on one or more program storage devices including but not limited to a magnetic floppy disk, RAM, ROM, CD ROM, and/or Flash memory.

In aspects including a "wireless network", the network may encompass any type of wireless network from which a Mobile Virtual Network Operator (MVNO) contracts with a Mobile Network Operator (MNO) wireless carrier to provide mobile phone services through the use of an electronic device, such as the Global System for Mobile Communication (GSM) network, Code-Division Multiple Access (CDMA) network or the like, that may utilize the teachings of the present application to allow a wireless device to connect to a wireless network. The network may income is a post-paid wireless carrier or Mobile Network Operators (MNO) that maintains and controls their own wireless networks. Namely, an MNO heavily relies on backend systems to address any provisional, billing, security, and data issues that might threaten the health of their networks.

In one aspect of the invention, there is described a method for improving user experience with porting a telephone number to an electronic device. Porting may be initiated independent of, concurrently with, or after, activation of an electronic device. That is, porting may be initiated via a porting application 255 that is separate from an activation software application 286. By so doing, any delays in completing the activation process of the electronic device are reduced and/or eliminated as well delays in porting a telephone number over from a previous service provider due to waiting until activation is complete.

The present application describes porting of any type of telephone number or quantity of telephone numbers over to the electronic device. Specifically, the telephone number could be ported over from an electronic device such as a landline telephone, a platform employing VoIP including but not limited to a tablet, laptop, desktop computer, or smartphone, or a non-smartphone. The telephone number can also be ported to an electronic device including but not limited to a landline, tablet, laptop, desktop computer, smartphone, or non-smartphone. In a particular aspect, the electronic device initiating the porting should have a memory and be capable of communicating on a communication channel as discussed in more detail below.

Activation Process

Prior to fully explaining the aspects of the invention regarding the technique of porting a telephone number to the electronic device, the process of activating an electronic device will be described. In this application, the terms provisioned and activated may interchangeably be employed as known to those of ordinary skill. In one aspect, there is disclosed a wireless device provisioning system 10 as illustrated in FIG. 1. The wireless device provisioning system 10 may be used to activate services on a wireless device 14. Wireless services can be activated through the wireless device provisioning system 10 to activate services for the wireless device 14 without requiring access to an agent, website, or wireless/landline telephone system. In one or more aspects, the activated services may include initial activation, e.g., "Out of the Box Activation," device upgrades, device reactivations, and wireless number porting of the wireless device 14 is described in U.S. Pat. No. 8,107,953, issued Jan. 31, 2012 and entitled SYSTEM AND METHOD FOR ACTIVATING SERVICES ON A WIRELESS DEVICE, incorporated by reference herein in its entirety.

In one aspect, the wireless device 14 prompts a user 12 to enter an activation code (or codes) into an inactive wireless device 14. For example, the activation code should be easy to input and to remember, such as, for example, but without limitation, a 5 digit zip code, a telephone number, a personal identification number (PIN), or another code. In addition, an option may exist to detect the zip code based upon a global navigation satellite system (GNSS) location. Alternatively, an airport name or code may be entered if the user is travelling abroad or if a foreigner is travelling in the United States. In another aspect, the wireless device 14 may automatically retrieve device-related information, such as but not limited to, a serial number for the wireless device 14 and a serial number for a subscriber identity module (SIM) card if installed in the wireless device 14.

The activation code is preferably short in length in comparison to serial numbers for the wireless device 14 and the SIM card so that the activation code(s) can easily be entered into the wireless device 14 with only a small number of characters or digits to enter, thereby providing a quick and efficient manner of obtaining relevant information from the user and the wireless device 14 while further minimizing the opportunity for a user to enter incorrect information.

The wireless device 14 then may generate an activation message that at least includes the activation code(s) input by the user and the automatically retrieved device-related information, where the activation message is transmitted over a provisioning channel 15 provided over a wireless carrier network 16 that is available to inactive or unprovisioned wireless devices 14. In one or more aspects, the provisioning channel 15 may be a data messaging channel, such as an Unstructured Supplementary Service Data (USSD) channel, a Short Message Service (SMS) messaging channel or a Wireless Application Protocol (WAP) messaging channel. The activation message may be delivered across the wireless carrier network 16 to a remote site for use in activating services on the wireless device 14. The wireless carrier network 16 may receive the activation message via a the provisioning channel 15 and then forwards in real time the activation message to a subscriber provisioning system 22 operated by a service provider for the activation of services for the wireless device 14. In one or more aspects, the services requested to be activated include at least one an initial "out of the box" activation of wireless services of an unprovisioned wireless device 14 or device upgrades, device reactivations, wireless number changes, the addition or purchasing of services including airtime, enrollments or content, and wireless number porting for wireless devices 14 that have previously been activated or provisioned. The wireless carrier network 16 is connected to a wireless carrier system 18 that forwards the activation message to the subscriber provisioning system 22, either directly or through a destination system 20 connected to the subscriber provisioning system 22, to initiate service activation and/or provisioning of the wireless device 14.

Porting Process

In another aspect, an airtime card may be preloaded in the SIM card for purposes of activating the wireless device. The number of days provided with the SIM card can range anywhere from 1 day to 365 days. Namely, as low as 1 day may be included with the SIM card to activate the wireless device. Additional airtime days may be provided for marketing purposes in order to attract customers.

A description of the porting process for a telephone number will be described below. In one or more aspects of the invention, the wireless device 14, either in a provisioned or unprovisioned state, is capable of initiating porting of a telephone number. In one aspect, porting is accomplished independent of activating an unprovisioned wireless device 14 via the provisioning channel 15. By so doing, porting can independently be initiated and performed without having to wait until completion of the activation step. If porting is completed before activation, the telephone number can be held in a "waiting" state. The ported telephone numbers is ready to operate on the wireless device 14 after activation is complete. The provisioning channel may, for example, be an Unstructured Supplementary Service Data (USSD) channel, a Short Message Service (SMS) messaging channel, a Wireless Application Protocol (WAP) messaging channel, or the like.

In another aspect, porting can occur after activation. In this case, the provisioned wireless device 14 operates on the wireless carrier network 16 associated with the SIM Card that is installed therein. In one aspect, the porting process is performed via the wireless carrier network 16. In another aspect, the porting process is performed via the provisioning channel. The latter may be preferred to ensure no data charges are incurred by the user. Either option will result in the telephone number being ported onto the wireless device 14 having a SIM card associated with a specific service provider.

Figure 2:
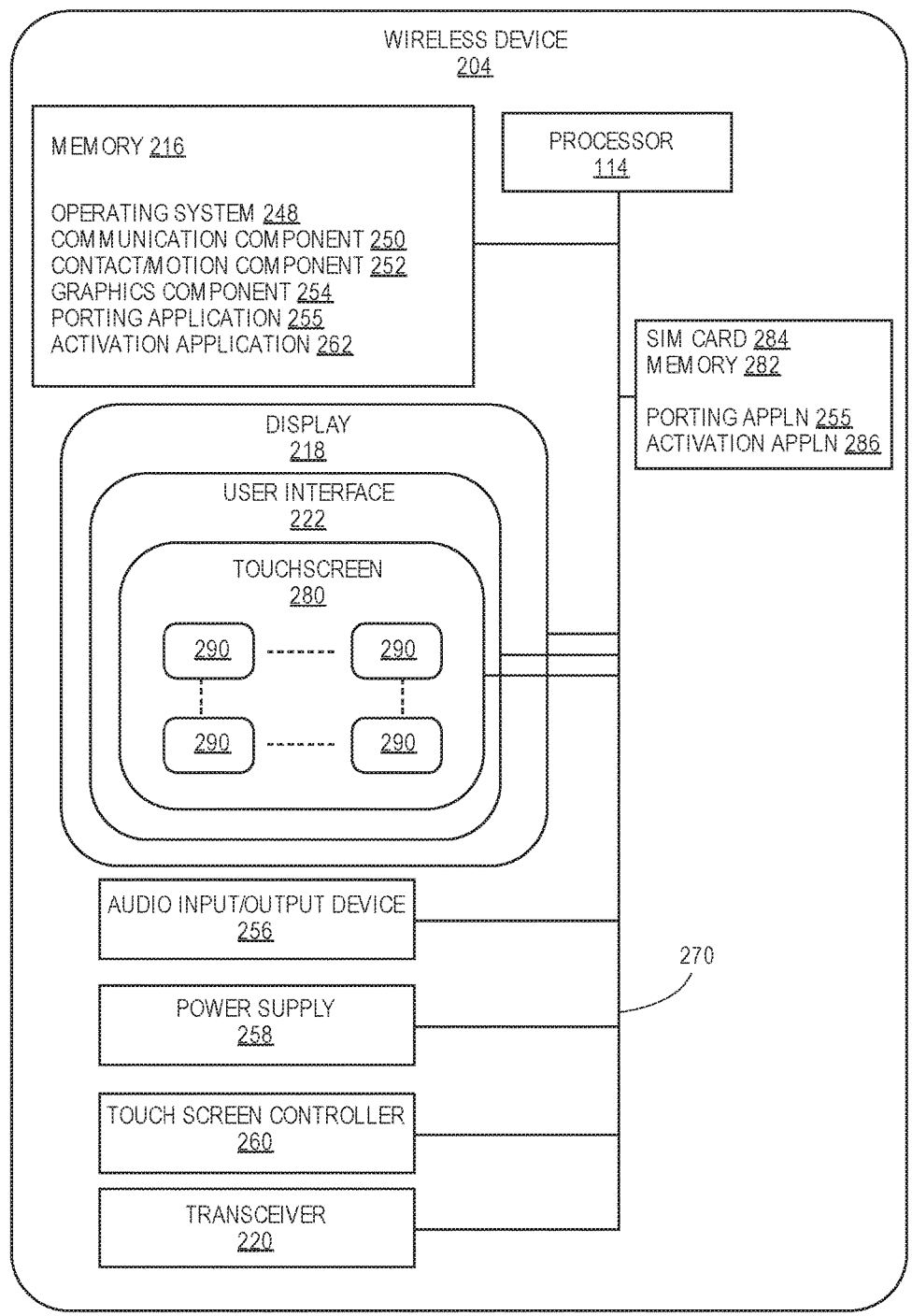
FIG. 2 illustrates a wireless device in accordance with an aspect of the invention.

The wireless device 14 employing the porting process will be described in reference to FIG. 2. The wireless device 204 may be provisioned or unprovisioned. The wireless device 204 includes a memory 216. The wireless device 204 may further include an operating system 248, a communication component 250, a contact/motion component 252, a graphics component 254, and the like. The operating system 248 together with the various components provides software functionality for each of the components of the wireless device 204. The memory 216 may include a high-speed, random-access memory. Also, the memory 216 may be a non-volatile memory, such as magnetic fixed disk storage, flash memory or the like. These various components may be connected through various communication lines including a data bus 270. The memory 216 may also store device related information including but not limited to a device serial number, such as, for example, an International Mobile Equipment Identify (IMEI), an Electronic Serial Number (ESN), or Mobile Equipment Identifier (MEID).

In another aspect of the invention, the memory 216 of a wireless device 204 includes a database for storing user information. The user information may include further information as required by the service provider and may include information such as full name, address, date of birth, telephone number, service provider associated with the service provider, email address, contact number, credit card information, and the like. In one aspect, the database may include security questions. In another aspect, the database may include user specified preferences. In yet another aspect, a digital signature can be entered by a user via a touch-sensitive screen of the wireless device 204. This may be necessary in case the service provider requires a signature of the user to initiate the porting process.

The wireless device 204 may also include a SIM card 284 having a memory 282. The memory 282 stores the SIM card serial number, such as, for example, an integrated Circuit Card ID (ICCID). The SIM card memory 282 may store an activation software application 286 for initiating activation of services on the wireless device 204. The SIM card memory 282 can be implemented in an external or internal machine-readable medium, which may be any mechanism that provides (i.e., stores and/or transmits) information in a form readable by the processor 214. For example, the machine-readable medium may be a read only memory (ROM), a random access memory (RAM), a cache, a hard disk drive, a portable storage media, an optical storage media, a flash memory device, or any other memory device capable of storing information. The SIM card memory may be used to store, arrange, and retrieve data. The SIM card memory 282 may provide instructions, which when read by processor, cause the processor 214 to perform operations for initiating activation and/or porting of services on the wireless device 204. It should be noted that the wireless device 204 may also be implemented without a SIM card 284 and the functionality of the SIM card 284 may simply be implemented at least in part by other components of the wireless device 204.

The wireless device 204 also includes a processor 214 which may be a central processing unit configured to execute instructions, such as, for example, instructions related to software programs. Any processor can be used for the electronic device as understood by those of ordinary skill in the art. The processor 214 may be coupled to the user interface 222, the SIM card 284, and the memory 216. The processor may be configured to collect the activation code discussed above in addition to SIM card serial number and wireless device serial numbers. In another aspect, the processor 214 is automatically capable of obtaining the serial numbers of the device and the SIM card. The display 218 may be a liquid crystal display (LCD). Preferably, the LCD includes a backlight to illuminate the various color liquid crystals to provide a more colorful display. The user interface 222 may be any type of physical input as readily employed in the field. For example, the user interface may have physical buttons. Alternatively, the user interface may be implemented on a touchscreen 280. Additionally, the wireless device 204 includes a power supply 258.

The wireless device 204 may include an audio input/output device 256. The audio input/output device 256 may include speakers, speaker outputs, microphones, microphone inputs, and the like, for receiving and sending sound inputs. In an exemplary aspect, the audio input/output device 256 may include an analog to digital converter and a digital to audio converter for audio input and output functions respectively.

In another aspect, the wireless device 204 may include a transceiver 220. The wireless device 204 may provide radio and signal processing as needed to access a network for services. The processor 214 may be configured to process call functions, data transfer, and the like and provide other services to the user.

In an exemplary aspect, the touchscreen 280 of the invention may be implemented in the display 218 and may detect a presence and location of a touch of a user within the display area. For example, touching the display 218 of the wireless device 204 with a finger or hand. The touchscreen 280 may also sense other passive objects, such as a stylus. The wireless device 204 may further include a touch screen controller 260.

In operation, the display 218 may show various objects 290 associated with applications for execution by the processor 214. For example, a user may touch the display 218, particularly the touchscreen 280, to interact with the objects 290. That is, touching an object 290 may execute an application in the processor 214 associated with the object 290 that is stored in memory 216. Additionally or alternatively, touching an object 290 may open a menu of options to be selected by the user. The display 218 may include a plurality of objects 290 for the user to interact with. Moreover, the display 218 may include a plurality of screens. The display 218 showing one screen at a time. The user may interact with the display 218 to move a screen into view on the display 218. Various objects 290 may be located in each of the screens.

The touchscreen 280 may have different attributes. The touchscreen 280 may be implemented as a resistive touchscreen, a surface acoustic wave touch screen, a capacitive touch screen, a surface capacitance touchscreen, projected capacitive touch screen, self-capacitance sensors, infrared sensors, dispersive signal technology, acoustic pulse recognition, or the like.

The display 218 is generally configured to display a graphical user interface (GUI) 222 that provides an easy to use visual interface between a user of the wireless device 204 and the operating system or application(s) running on the wireless device 204. Generally, the GUI presents programs, files, and operational options with graphical images. During operation, the user may select and activate various graphical images, which appear on the display 218 in order to initiate functions and tasks associated therewith.

In another aspect of the invention, the wireless device 204 is configured to display a user interface of the porting application 255 for porting a telephone number on a display 218. The interface can include prompts for inputting user information to determine whether porting can be accomplished. Namely, a telephone number from a different geographical region may likely not be portable. The user interface also includes prompts for inputting additional information, such as, for example, name on account, billing address of account, account number, service providers, etc. for completing the porting process when the service provider associated with the telephone number is different from the service provider requesting the porting.

Figure 3:
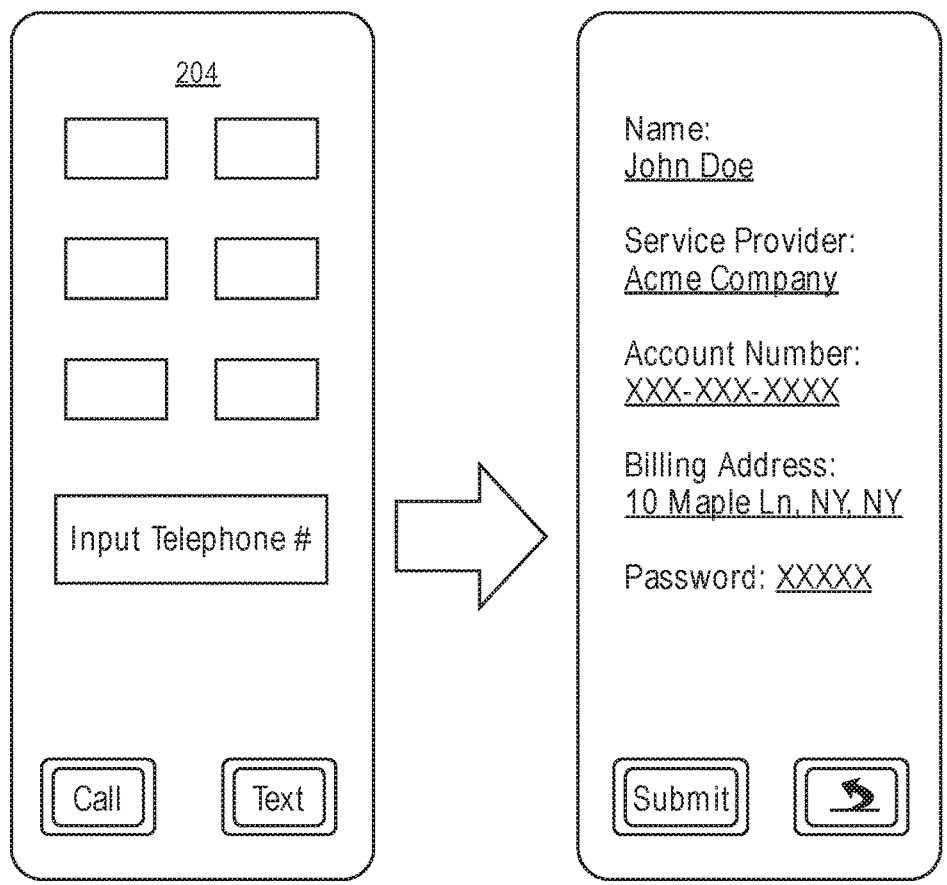
FIG. 3 illustrates an initial and subsequent screen of a wireless device in accordance with an aspect of the invention.
Figure 4:
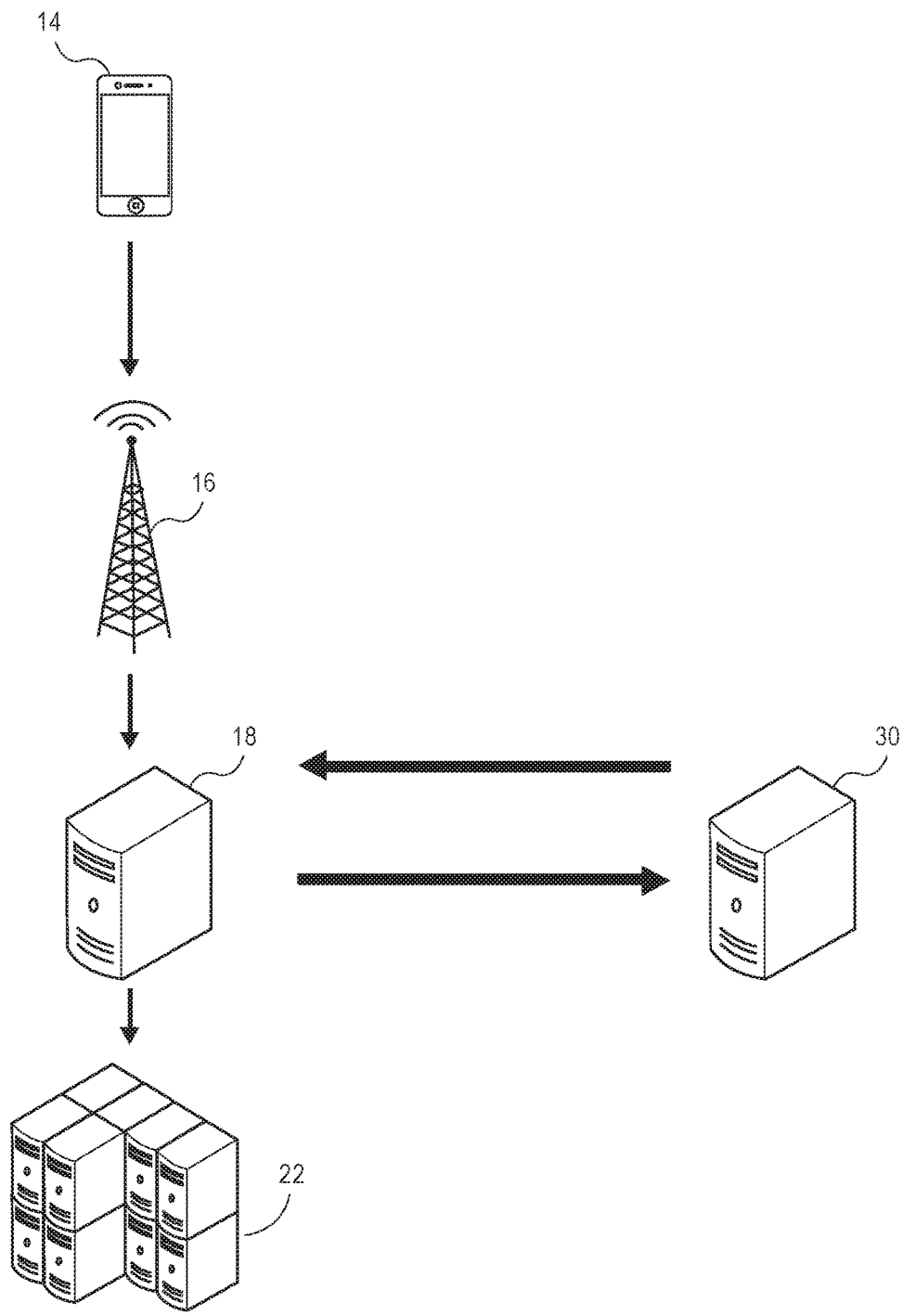
FIG. 4 illustrates a communication interface between a new service provider and the original service provider for porting a telephone number in accordance with an aspect of the invention.

According to another aspect of the invention, as shown in FIG. 3, there is illustrated a first screen 300 having a user interface 222 of a display 218 which includes a prompt for inputting user information for purposes of porting a telephone number. For example, the prompt may request inputting a telephone number. Upon receiving the telephone number, the porting application 255, that may be stored in the SIM Card memory 282, determines whether the telephone number is associated with the same service provider for the wireless device 204. The determining step requires the application to contact the wireless carrier system 18 via the wireless carrier network 16 to assess whether the telephone number is associated with the service provider associated with the wireless device 204 and/or SIM card 24. If the porting application 255 confirms that the service provider is the same, porting may be automatically initiated. The benefit attributed to this aspect is not having to obtain and wait for authorization for the porting process.

In an alternative aspect, the porting application 255 asks subsequent questions to verify the identity of the user and ensure that the telephone number wishing to be ported over to the new service provider is accurate. Subsequent questions may include but are not limited to the name, service provider, account number, billing address and password (if applicable) as shown in the subsequent screen 350.

As a preliminary or secondary step, the porting application 255 may determine whether the telephone number can be ported to the wireless device 204. That is, the application to 55 determines a geographic area associated with the telephone number and compares it with the geographic area associated with the wireless device 204 and/or SIM card 284. If the telephone number is determined to be portable, the application may automatically proceed to the subsequent screen 350 as discussed above.

If, on the other hand, the porting application 255 determines that the telephone number is not within the same or surrounding geographic area of the wireless device 204 and/or the SIM card 284, the application may send a communication to the display of the wireless device 204 informing the user that porting cannot be accomplished. Alternatively, a communication may be sent directly to the service provider's customer service department. In turn, the customer service department may contact the subscriber using any known communication mediums discussed above to investigate the matter in more detail.

In another aspect, the porting application 255 may determine that the inputted telephone number is not associated with the instant service provider. In this scenario, the porting application 255 also may request the name of the service provider as shown in subsequent screen 350. The application, if the wireless device 204 is nonprovisioned, may submit a request through a USSD channel. Alternatively, the application to 55 may submit the request directly via the wireless carrier network 16, if provisioned, to the wireless carrier system 18. The wireless carrier system 18, in turn, communicates via the Internet with a system 30 associated with the service provider for the telephone number to be ported.

One of two scenarios may transpire. If the system 30 presently associated with the telephone number confirms its existence on the wireless network, system 30 may authorize transmittal of the telephone number to the requesting service provider. On the other hand, the system 30 after checking its system indicates that the telephone number is not associated with its wireless network. A communication may be sent through the Internet from system 30 to the requesting wireless carrier system.

The requesting system 30 receives the reply. The time period for receiving the reply varies anywhere from a couple minutes to a couple days. The time period is much shorter than the conventional communication channels whereby the subscriber communicates its request via the Internet or through a customer service agent. This is attributed to both the wireless carrier system 18 and the system 30 directly communicating with each other via a network such as the Internet based upon predetermined algorithms without having to pass through portals on each other's networks.

If the telephone number is not associated with the inputted service provider, the requesting system 30 may automatically send the reply via the porting application 255 to the display of the wireless device 204. By so doing, the user can verify the account number input on the subsequent screen 350 via the user interface. The user also may have the opportunity to try again. In an alternative aspect, the user may be given a couple attempts before the application is locked out. For example, two, three, or more attempts may be offered to the user before the application is locked out. This prevents unnecessary, continuous use of the network when there are multiple failed attempts.

If the number is verified by the system 30 as belonging to its network, the authorization is sent to the wireless carrier system 18, which in turn transmits the authorization to the subscriber provisioning system 22. That is, subscriber provisioning system 22 may be configured to operate as both a provisioning and activation system. The subscriber provisioning system 22 may confirm that the telephone number may be associated with the wireless device 204 having the SIM card 284. The decision may be sent via subscriber provisioning system 22 to the wireless network. Thereafter, calls placed to the wireless device 204 can be answered.

Figure 5:
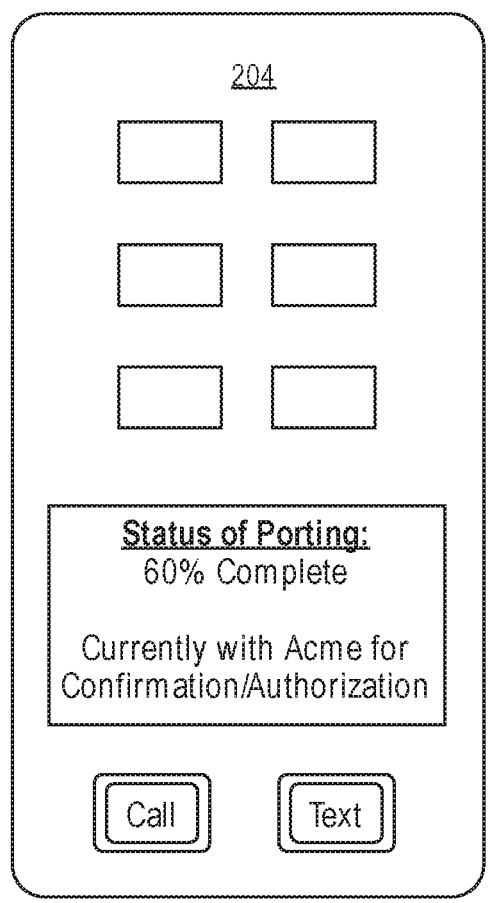
FIG. 5 illustrates a tracking system for a wireless device in accordance with an aspect of the invention.

In yet a further aspect of the invention, the porting application 255 may be configured to provide a status of the porting process to the service provider as shown in FIG. 5. The status allows the user to know how much time remains before porting is complete. For example, as shown in FIG. 5, the home screen 500 indicates that 60% of the porting is complete. The tracking process preferably indicates percentages of completion in multiples of ten, including but not limited to, 10%, 20%, 30%, 40%, 50%, 60%, 70%, 80%, 90% and 100%. Alternatively, any other type of indication may be utilized as well including minutes, hours, days or the like. The home screen also may provide a real-time status of a status of the porting process. For example, home screen 500 indicates that porting is currently with Acme Company, e.g., service provider associated with the telephone number. The next step would be for Acme Company to confirm the existence of the telephone number and authorize porting to the requesting service provider. Alternatively, Acme Company could identify the telephone number as not being associated with, e.g., foreign, to its wireless network. The present tracking system is similar in theory to a package delivery tracking system, which can be employed for porting purposes.

In yet a further aspect, the porting application 255 can provide a temporary line number while the user's existing number is being ported. The temporary line number is generally received after activation. In one aspect, voice messages and/or SMS messages to the user's telephone number are queued, and ultimately delivered to the user once the telephone number is migrated or ported over to the new wireless device.

In yet even a further aspect of the invention, the software application is configured to receive authorization from the user via the user interface to communicate directly with the old service provider to cancel services. This alleviates the user from having to contact the old service provider, which can often be an uncomfortable experience. The new service provider may receive authorization via the digital signature described above. Accordingly, the new service provider obtains authorization to act on the user's behalf for the purpose of terminating services with the old service provider. Termination of services should be done only after the telephone number has been properly migrated over to the new device and service provider.

According to yet another aspect of the invention, there is disclosed a system including a display, a non-transitory memory for storing instruction for porting, and a processor configured to execute the instructions. The system may be an electronic device, such as, for example, a wireless device. In one aspect, the system is a wireless device is a smartphone, a tablet, or a personal digital assistant. The system includes a non-transitory memory having instructions stored thereon for porting the telephone number to the electronic device. The non-transitory memory is configured to store user information selected from customer name, billing address, service provider, account number, email address, passwords, and combinations thereof.

The display is configured to display a user interface having a prompt to input a telephone number. The processor is operatively coupled to the memory and the display. The processor configured to perform the instructions including: receiving the user information via the user interface; and determining whether the received telephone number is portable. In another aspect, the processor is configured perform the instructions of requesting a service provider associated with the telephone number to transmit the telephone number to the electronic device; and transmitting the telephone number to the electronic device. In another aspect, the processor is configured to perform the instructions of forwarding a telephone call placed to the telephone number during the transmitting step to a temporary telephone number associated with the electronic device. In yet another aspect, the processor is configured to perform the instructions of displaying a status of the porting process. In yet even a further aspect, the processor is configured to perform the instructions of sending a request via the user interface to cancel telephone service with the service provider after the transmitting step.

In yet a further aspect of the invention, there is disclosed a non-transitory computer-readable or processor-readable medium. The terms "computer-readable medium" and "processor-readable medium" include a single medium or multiple media, such as a centralized or distributed database, and/or associated caches and servers that store one or more sets of instructions. The terms "computer-readable medium" and "processor-readable medium" also include any medium that is capable of storing a set of instructions for execution by a processor or that cause a computer system to perform any one or more of the methods or operations disclosed herein.

The non-transitory computer-readable or processor-readable medium includes instructions stored thereon for a software application for improving user experience with porting a telephone number to an wireless phone, which when executed, causes the wireless phone to perform the following steps: (i) displaying a user interface on a display of the wireless phone for initiating porting of a telephone number; (ii) determining whether the telephone number is portable upon receiving user information via the user interface; and (iii) transmitting the telephone number to the wireless phone. In an exemplary aspect, the code or instruction of the software program is executable by a processor of the SIM or electronic device in machine readable form.

In one or more aspects, the actions and/or events of a method, algorithm, or module may reside as one or any combination or set of codes and/or instructions on a computer readable medium or machine readable medium, which may be incorporated into a computer program product. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an inter-network, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

According to an example, the global navigation satellite system (GNSS) may include a device and/or system that may estimate its location based, at least in part, on signals received from space vehicles (SVs). In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may comprise, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. A method for porting a telephone number comprising:
   displaying a user interface on a display of a mobile electronic communication device having a processor in response to execution of a porting application by the processor for initiating porting of the telephone number that includes a request for user information;
   receiving the user information associated with the telephone number via the user interface generated by the porting application;
   transmitting the user information from the mobile electronic communication device along with a request to port the telephone number to the mobile electronic communication device with the porting application;
   requesting a service provider associated with the telephone number to port the telephone number to the mobile electronic communication device;
   receiving information on whether the telephone number is portable or not based on at least a geographic area being associated with the telephone number and the mobile electronic communication device;
   displaying information on the user interface of the display indicating whether the telephone number is portable or not;
   displaying a real-time status of a porting process on the user interface of the display generated by the porting application after the transmitting, the porting application obtaining the real-time status, the real-time status comprising at least one of the following: a real-time percentage of completion of the porting process and a real-time remaining amount of time until completion of the porting process;
   receiving confirmation that the telephone number has been ported; and
   updating the mobile electronic communication device to utilize the telephone number,
   wherein the user interface displays a prompt for inputting the telephone number;
   wherein the transmitting comprises transmitting the user information from the mobile electronic communication device on a provisioning channel;
   wherein the provisioning channel comprises at least one of the following: an Unstructured Supplementary Service Data (USSD) channel, a Short Message Service (SMS) messaging channel and a Wireless Application Protocol (WAP) messaging channel; and
   wherein the user information is selected from at least one of the following: customer name, customer billing address, service provider, account number, telephone number, email address, and password.

2. The method according to claim 1, further comprising providing a temporary phone number while the telephone number is being ported.

3. The method according to claim 1, wherein the user interface displays a prompt for inputting a digital signature.

4. The method according to claim 1, further comprising:
   sending a request after the transmitting to cancel telephone service with a service provider associated with the telephone number via the user interface.

5. The method according to claim 1, wherein the method is performed during activation of the mobile electronic communication device.

6. The method according to claim 1,
   wherein the method is implemented by the mobile electronic communication device with the porting application;
   wherein the porting application is stored on a subscriber identity module (SIM) card; and
   wherein the user interface for porting the telephone number is automatically displayed on the mobile electronic communication device.

7. The method according to claim 1, wherein the mobile electronic communication device is a wireless phone.

8. The method according to claim 1, wherein the mobile electronic communication device is a pre-paid phone operating on a mobile virtual network.

9. A non-transitory tangible computer readable storage medium storing computer-readable instructions for a porting application for porting a telephone number to a wireless phone, which when executed, causes a processor of the wireless phone to execute instructions, the computer readable storage medium including a porting application, and the porting application comprising:
   instructions for displaying a user interface on a display of a mobile electronic communication device for initiating porting of the telephone number that includes a request for user information;
   instructions for receiving the user information associated with the telephone number via the user interface;
   instructions for requesting a service provider associated with the telephone number to port the telephone number to the mobile electronic communication device;
   instructions for receiving information on whether the telephone number is portable or not based on at least a geographic area being associated with the telephone number and the mobile electronic communication device;
   instructions for displaying information on the user interface of the display indicating whether the telephone number is portable or not;
   instructions for transmitting the user information from the mobile electronic communication device along with a request to port the telephone number to the mobile electronic communication device;

instructions for displaying a real-time status of a porting process on the user interface of the display after the transmitting, the real-time status comprising at least one of the following: a real-time percentage of completion of the porting process and a real-time remaining amount of time until completion of the porting process;

instructions for receiving confirmation that the telephone number has been ported; and instructions for updating the mobile electronic communication device to utilize the telephone number, wherein the user interface displays a prompt for inputting the telephone number;

wherein the transmitting comprises transmitting the user information from the mobile electronic communication device on a provisioning channel;

wherein the provisioning channel comprises at least one of the following: an Unstructured Supplementary Service Data (USSD) channel, a Short Message Service (SMS) messaging channel and a Wireless Application Protocol (WAP) messaging channel; and wherein the user information is selected from at least one of the following: customer name, customer billing address, service provider, account number, telephone number, email address, password and combinations thereof.

10. The computer readable storage medium according to claim 9, further comprising instructions for providing a temporary phone number while the telephone number is being ported.

11. The computer readable storage medium according to claim 9, wherein the user interface displays a prompt for inputting a digital signature.

12. The computer readable storage medium according to claim 9, further comprising:

sending a request after the transmitting to cancel telephone service with a service provider associated with the telephone number via the user interface.

13. The computer readable storage medium according to claim 9 wherein the porting is performed during activation of the mobile electronic communication device.

14. The computer readable storage medium according to claim 9 wherein at least one of the instructions is implemented by the mobile electronic communication device with the porting application;

wherein the porting application is stored on a subscriber identity module (SIM) card; and wherein the user interface for porting the telephone number is automatically displayed on the mobile electronic communication device.

15. The computer readable storage medium according to claim 9 wherein the wireless phone is a pre-paid phone operating on a mobile virtual network.

16. A method for porting a telephone number comprising:

receiving transmitted user information from a mobile electronic communication device along with a request to port the telephone number to the mobile electronic communication device with a porting application, the user information associated with the telephone number being received via a user interface generated by the porting application on a display of the mobile electronic communication device for initiating porting of the telephone number that includes a request for user information;

requesting a service provider associated with the telephone number to port the telephone number to the mobile electronic communication device;

transmitting to the mobile electronic communication device information on whether the telephone number is portable or not based on at least a geographic area being associated with the telephone number for display on the user interface to indicate whether the telephone number is portable or not;

transmitting to the mobile electronic communication device a real-time status of a porting process for display on the user interface of the display generated by the porting application, the porting application displaying the real-time status on the display, the real-time status comprising at least one of the following: a real-time percentage of completion of the porting process and a real-time remaining amount of time until completion of the porting process;

receiving confirmation that the telephone number has been ported; and updating the mobile electronic communication device to utilize the telephone number, wherein the user interface displays a prompt for inputting the telephone number;

wherein the receiving the transmitted user information comprises receiving the user information from the mobile electronic communication device on a provisioning channel;

wherein the provisioning channel comprises at least one of the following: an Unstructured Supplementary Service Data (USSD) channel, a Short Message Service (SMS) messaging channel and a Wireless Application Protocol (WAP) messaging channel; and wherein the user information is selected from at least one of the following: customer name, customer billing address, service provider, account number, telephone number, email address, and password.

17. The method according to claim 16, further comprising providing a temporary phone number while the telephone number is being ported.

18. The method according to claim 16, further comprising receiving a digital signature.

19. The method according to claim 16, further comprising sending a request to cancel telephone service with a service provider associated with the telephone number via the user interface.

20. The method according to claim 16, wherein the mobile electronic communication device is a pre-paid wireless phone operating on a mobile virtual network.

* * * * *